(12) United States Patent
Dussinger et al.

(10) Patent No.: US 8,578,767 B2
(45) Date of Patent: Nov. 12, 2013

(54) TIRE MODULE AND TIRES EQUIPPED THEREWITH

(75) Inventors: Axel Dussinger, Bad Rappenau (DE); Ralf Kessler, Pfinztal (DE); Benjamin Mueller, Bad Friedrichshall (DE); Andre Seifert, Pforzheim (DE); Ingemar Wolf, Meorlenbach (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 17 days.

(21) Appl. No.: 13/269,844

(22) Filed: Oct. 10, 2011

(65) Prior Publication Data

US 2012/0085160 A1 Apr. 12, 2012

(30) Foreign Application Priority Data

Oct. 12, 2010 (DE) .......................... 10 2010 038 136

(51) Int. Cl.
- B60C 23/02 (2006.01)
- B60C 23/04 (2006.01)
- B60C 23/06 (2006.01)

(52) U.S. Cl.
CPC ............. B60C 23/041 (2013.01); B60C 23/064 (2013.01); B60C 23/0411 (2013.01)
USPC ........................................................ 73/146.5

(58) Field of Classification Search
USPC ................................................. 73/146–146.8
See application file for complete search history.

(56) References Cited

U.S. PATENT DOCUMENTS

| | | | |
|---|---|---|---|
| 7,212,104 B2 | 5/2007 | Haswell et |  |
| 2003/0209063 A1* | 11/2003 | Adamson et al. | 73/146 |
| 2003/0209064 A1* | 11/2003 | Adamson et al. | 73/146 |
| 2004/0211250 A1* | 10/2004 | Adamson et al. | 73/146 |
| 2005/0134444 A1* | 6/2005 | Park et al. | 340/445 |
| 2006/0243043 A1* | 11/2006 | Breed | 73/146 |
| 2007/0074566 A1 | 4/2007 | Roundy et al. | |
| 2007/0267946 A1* | 11/2007 | Haas et al. | 310/339 |
| 2007/0295069 A1* | 12/2007 | Mancosu et al. | 73/146 |
| 2008/0264537 A1* | 10/2008 | Behrends et al. | 152/152.1 |
| 2009/0039733 A1* | 2/2009 | Huovila et al. | 310/319 |
| 2009/0211352 A1* | 8/2009 | Hatanaka et al. | 73/146 |
| 2009/0243830 A1* | 10/2009 | Heise et al. | 340/447 |
| 2010/0126263 A1* | 5/2010 | Brusarosco et al. | 73/146 |
| 2010/0186493 A1* | 7/2010 | Brusarosco et al. | 73/146.3 |
| 2010/0236036 A1* | 9/2010 | Stark | 29/25.35 |
| 2011/0113876 A1* | 5/2011 | Kammann | 73/146.5 |
| 2012/0211997 A1* | 8/2012 | Bonisoli et al. | 290/1 R |

FOREIGN PATENT DOCUMENTS

| | | |
|---|---|---|
| EP | 10 2004 031 810 A1 | 1/2006 |
| WO | WO 2005116610 A1 * | 12/2005 |
| WO | WO 2010/092171 A2 | 8/2010 |

* cited by examiner

Primary Examiner — Andre Allen (57) ABSTRACT

A tire module, for installation on an inner side of a pneumatic tire for vehicles, including a device for measuring and/or monitoring of the air pressure in the tire, a transmitter for transmitting radio signals, which contain information about the air pressure in the tire, a mechanical-electrical converter having a bendable piezoelectric element, which converts into electric energy alternating deformations of the piezoelectric element caused by the rolling tire, and a storage device for the electric energy, which is connected to the converter. The converter includes a circular, disc-shaped, piezoelectric element (piezo disc) on which an electrical voltage generated by the piezo effect is tapped at contact points, which are situated on opposite sides of the piezo disc.

22 Claims, 5 Drawing Sheets

TIRE MODULE AND TIRES EQUIPPED THEREWITH

The invention relates to a tire module according to the features specified in the preamble of claim 1. Such a tire module is disclosed for instance in document DE 10 2004 031 810 A1. The known tire module is mounted on the inner side of a pneumatic tire for vehicles. It includes a device for measuring and/or monitoring the air pressure in the tire and a transmitter for transmitting radio signals, which contain information about the air pressure in the tire. The electric energy required by the tire module is delivered by a mechanical-electrical converter having a bendable piezoelectric element, which converts into electrical energy all the alternating changes in shape of the piezoelectric element caused by the rolling tire. The alternating deformations of the piezoelectric element are caused by the tire continuously being deformed when driving, in particular at the transitions of its footprint (tread shuffle) to the area of the tread of the tire, which presently has no contact with the roadway. The electric energy delivered by the mechanical-electrical converter is conveyed to a storage device, in particular a capacitor or an accumulator, from which the energy can be drawn for operating the device for measuring and/or monitoring the air pressure and for operating the transmitter. The mechanical-electrical converter using the piezo effect can replace a long life battery otherwise required in the tire module.

The tire module disclosed in document DE 10 2004 031 810 A1 has as a piezoelectric element a bending beam which is mounted in a housing attached on the inner side of the tire.

The object of the present invention is to provide a tire module which is particularly easy to install.

SUMMARY OF THE INVENTION

The tire module according to the invention has a device for measuring and/or monitoring of the air pressure in the tire, a transmitter for transmitting radio signals, which contain information about the air pressure in the tire, a mechanical-electrical converter fitted with a bendable piezoelectric element, which converts into electric energy alternating deformations of the piezoelectric element caused by the rolling tire, and a storage device for the electric energy, which is connected to the converter. The converter comprises a circular, disc-shaped, piezoelectric element, which is designated below as piezo disc and on which an electrical voltage generated by the piezo effect is tapped at contact points, which are situated on opposite sides of the piezo disc.

The tire module according to the invention has significant advantages:
  By using a circular, disc-shaped, piezoelectric element, the tire module, which is arranged advantageously in such a way that the centre line of the circular piezo disc is vertical to the running tread of the tire and hence radial in relation to the rotational axis of the tire, can incidentally be attached in any orientation on the inner side of the tire. Rotations of the tire module around the centre line of the circular piezo disc remain without noteworthy influence on the efficiency of the mechanical-electrical converter.
  The use of a circular piezo disc can be combined with a flat, cylindrical housing for the tire module, whose diameter is guided by the diameter of the piezo disc. This allows for a particularly compact structure of the tire module with minimum mass.
  Minimum mass means minimum out-of-balance and minimum inertia forces, which for its own part secure long service life,
  A tire module with flat, cylindrical housing can be handled particularly easily and fastened easily and durably on the inner side of the tire.
  The tire module is advantageously fastened in the center area of the running tread on the inner side of the tire. Any erroneous arrangement of the tire module according to the invention is not possible there.

The circular, disc-shaped, piezoelectric element consists preferably of a piezo ceramic, for instance of lead zirconate titanate. But the piezoelectric element can also be formed in that a substrate, in particular a metal substrate, is coated with a piezoelectric material. In such a case, the substrate serves as a carrier for the piezoelectric material. The term "piezo disc" is used for both embodiments in this patent description. The piezo disc is mounted in the tire module in such a way that changes in shape of the running tread of the tire generate changes in shape of the piezo disc, which in particular occur at tread shuffle run-in and run-out. The alternating changes in shape generate on the piezo disc an electrical voltage, which can be tapped at contact points, which are situated on opposite sides of the piezo disc.

One of the contact points, which is used for tapping the electrical voltage, is preferably formed by a circular metal disc, which fully covers a first side of the piezo disc. The circular metal disc is so thin and bendable that it does not impede the desired bending of the piezo disc when passing through the tread shuffle area and protects the piezoelectric material, in particular against breakage. In the embodiment, in which a metal substrate is coated with piezoelectric material, the metal substrate can be used as the one contact point of the piezo disc.

The metal disc which fully covers a first side of the piezo disc and is used as an electrical contact point, has preferably a slightly larger diameter than the piezo disc.

The second side of the piezo disc is preferably provided only partially with one or several contact points. This makes it easier to provide that the compound body formed by the piezo disc, the contacting metal disc on the first side of the piezo disc and the electrical contact material on the second side of the piezo disc, has a neutral fiber which does not lie in the center of the piezo disc when bending said piezo disc, but rather on the boundary of the piezo disc or even in the metal disc. This is important to secure a good efficiency of the mechanical-electrical converter on piezo basis.

Several contact points which are connected to one another in an electrically conductive manner are preferably provided on the second side of the piezo disc. This guarantees that the mechanical-electrical converter does not already fail should one contact point come loose from the piezo disc. The one or the several contact points on the second side of the piezo disc are preferably arranged centrally on the piezo disc and advantageously do not cover more than 20%, preferably at most 10% of the surface of the second side of the piezo disc.

The piezo disc is preferably arranged between the metal disc on the first side of the piezo disc and a flexible conductor path foil on the second side of the piezo disc. Conductor paths leading to the contact points on the second side of the piezo disc and possibly connecting those with each other and with the storage device for the electric energy provided in the tire module, are situated on the flexible conductor path foil. The conductor path foil can also have a conductor path which creates the electrical connection between the metal disc on the first side of the piezo disc and the storage device for the electric energy. The connection between the conductor paths and the metal disc on the first side of the piezo disc and the contact points on the second side of the piezo disc can for instance be created by reflow soldering. To do so, several solder joints can be arranged for safety reasons between the metal disc and the conductor path of the conductor path foil to be connected with said metal disc. The conductor path through which the connection is formed with the circular metal disc, runs preferably at the rim of the circular disc and extends practically over the whole circumference of the circular disc.

The conductor path foil can have (similar to a printed circuit board) conductor paths on both sides of the conductor path foil. This offers a possibility to insulate electrically the conductor path leading to the first side of the piezo disc, from the conductor paths leading to the contact points on the second side of the piezo disc. But the conductor paths can also run on one and the same side of the conductor path foil. Inasmuch as they hence lead over an edge region of the circular metal disc, they can be insulated there from one another by an electrically insulating varnish.

The metal disc should stick to the piezo disc. This can be done for instance by means of a conductive adhesive. A conductive adhesive is an adhesive in which electrically conductive pigments are distributed.

The conductor path foil, which covers the first side of the piezo disc, forms preferably a circular area, which is connected to a circuit carrier by a strip, which preferably also consists of the conductor path foil and starts from the rim of the circular area. The circuit carrier also consists preferably of the conductor path foil, so that said carrier and the circular area, which covers the first side of the piezo disc, can be formed in a single piece from the flexible conductor path foil. This is suitable for a light, cost-efficient and compact structure of the tire module. The structure is then particularly compact when both circular areas, which preferably match in diameter, are arranged on top of one another and preferably coaxially to one another and when a stiff distance washer, preferably a rigid distance washer, which is also preferably circular, is assembled in between both circular areas. Both circular areas can be brought in such a position that the conductor path foil in the area of the strip is folded up around said distance washer thereby arranging said distance washer in between. The piezo disc, the distance washer and the portion of the conductor path foil, which forms the circuit carrier and is fitted with the components and circuit parts of the tire module, are thus arranged on top of one another in a particular compact manner and can be received by a housing with cylindrical barrel surface, whereas the diameter of the barrel surface of the housing is guided by the diameter of the piezo disc and of the preferably slightly larger metal disc, which carries the piezo disc.

The distance washer is preferably domed convexly on its side pointing to the piezo disc. This has the advantage that in this manner a free space is formed, into which the rim of the piezo disc can be bent. The size of said free space is advantageously chosen in such a way that the bent piezo disc comes in surface-to-surface contact with the convex side of the distance washer pointing thereto, before it can break.

Advantageously, the components of the tire module, with the exception of a free space between the convex side of the distance washer and the circular area pointing to the convex side of the distance washer, as well as with the exception of the side of the metal disc facing away from the piezo disc, are embedded in an electrically insulating casting compound. The casting compound protects the components of the tire module against dust and in particular against the penetration of humidity. In order to prevent the penetration of the casting compound into the free space between the convex side of the distance washer and the side of the conductor path foil pointing thereto, a seal ring preferably having a rectangular cross-section is provided between the distance washer and the circular area being formed by the conductor path foil and facing the piezo disc. The seal ring preferably consists of a compressible foamed material.

Once the casting compound has solidified after casting the components of the tire module, it has preferably a substantially cylindrical circumferential surface. By "substantially" is meant here that the form of the circumferential surface can depart from the ideal cylindrical shape, to be able to demold the cast tire module since the casting should take place in a casting mold, out of which the module should be removed after solidifying of the casting compound, for which purpose a small conicity of the casting mold is suitable to facilitate the demolding.

A cap is preferably provided into which the cast tire module is inserted. Said cap has preferably on its rim a flange facing outwards, with which flange the cap can be fixed to the inner side of the tire. The cap is more appropriately a prefabricated molded part. For the cap to receive the cast module free of play, the circumferential surface of the casting compound of the tire module has preferably oversize with respect to the clear width of the empty cap, so that the cap is stretched a little when the tire module is inserted therein. The height of the tire module has preferably also oversize with respect to the clear height of the cap, so that the cap is also stretched a little in height when being fastened to the inner side of the tire once the tire module has been inserted. This fastening can be done in different ways, for instance by vulcanizing the flange of the cap to the inner side of the tire, in particular by cold vulcanizing. Another possibility consists in gluing the flange of the cap with the inner side of the tire, for instance by a hot melt.

The cap consists advantageously of an elastomeric material, in particular a rubber-based material.

If the tire module should have a device for measuring the air pressure in the tire, the air in the tire must then have access to the inside of the tire module. It is known to provide for measuring the air pressure in the tire an integrated circuit in which an electrical pressure sensor, in particular a silicon-based sensor, is integrated. Such an integrated circuit has an opening which enables the access of the pressurized air to the pressure sensor, whereas said opening may contain a filter element to protect against contamination. An access in the casting compound as well as in the cap has to be left open above such an opening, by which the pressure sensor communicates with the compressed air in the tire.

In an advantageous further embodiment of the invention, the tire module does not only contain a transmitter with a transmitting antenna, but also a receiver with a receiving antenna. While the transmitter usually sends with frequencies above 100 MHz, the receiver in the tire module is preferably designed for a substantially lower frequency, in particular for a frequency of 125 kHz. Said receiving antenna enables to receive signals which transport information, for instance signals for adjusting and/or programming a control circuit provided in the tire module, which control circuit can be for instance a microprocessor, a microcontroller or an ASIC. Said receiving antenna can also receive signals containing data, which characterize the tire as such, for instance the type and year of manufacture, and data which characterize the tire module, for instance an individual identifier, that is to say a code, which is sent as well every time, the tire module sends out a signal so that the receiver of said signal can determine using the transmitted identifier from which tire module the signal originates.

But the low-frequency receiving antenna of the tire module also enables to receive radio transmitted electric energy for charging the storage device in the tire module. This is advantageous when the vehicle stood still until the storage device provided in the tire module for electric energy has discharged. Thus the storage device can for instance be charged in a workshop during maintenance works, where it is not possible to charge up the storage device with said piezo-electrically operating mechanical-electrical converter.

BRIEF DESCRIPTION OF THE DRAWINGS

Further advantages and features of the invention can be seen in the following description of an exemplary embodiment of the invention.

DETAILED DESCRIPTION

Figure 1:
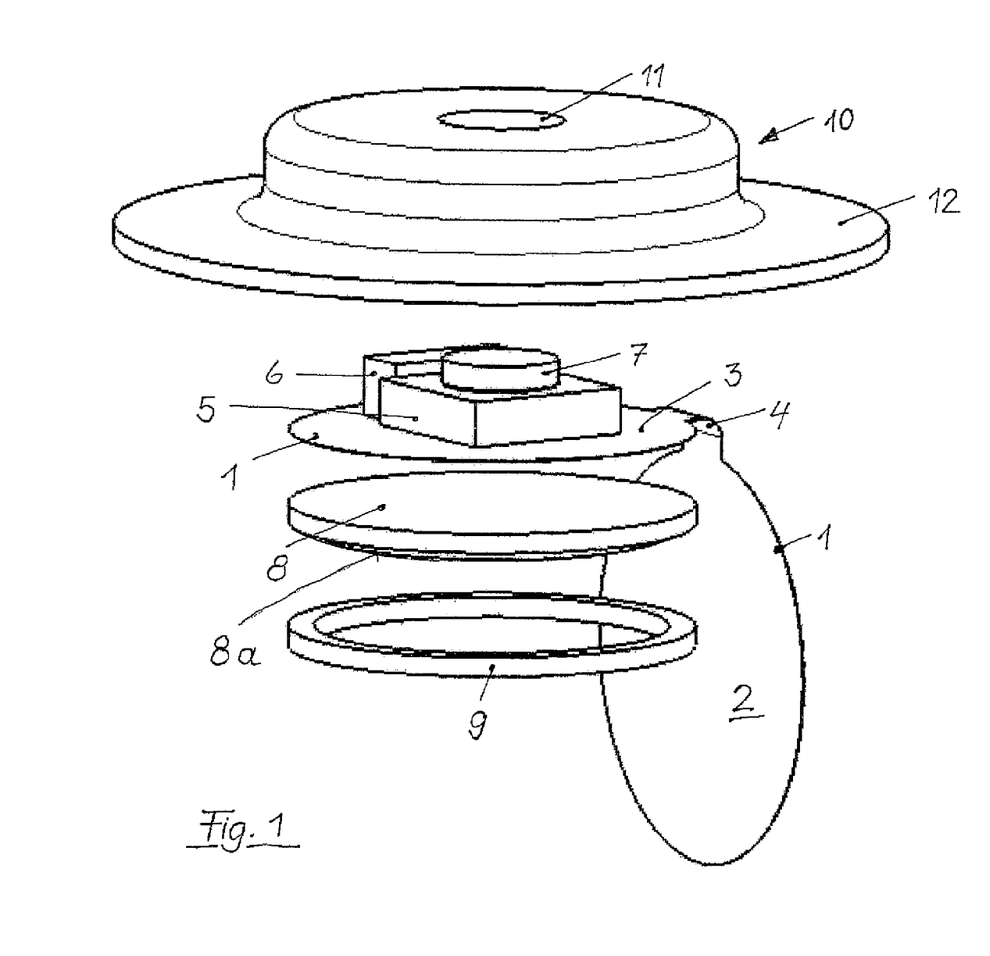
FIG. 1 shows a tire module according to the invention in an exploded view, namely in an oblique view.

FIG. 1 shows a flexible conductor path foil 1, which forms a first circular area 2, a second circular area 3 and a strip 4, which connects both circular areas 2 and 3 together in one piece. The circular area 3 is a circuit carrier, on which an integrated circuit 5 and an additional electrical component 6 are arranged, only represented by way of example and schematically. The figure should only show that the circuit carrier 3 carries electrical and electronic components. The integrated circuit (IC) 5 contains a pressure sensor in its housing. For this purpose, the housing of IC 5 has an opening 14, see FIG. 2, which is covered by a filter 7.

A circular disc 8 made of rigid synthetic material is arranged under the circuit carrier, whose lower side 8a is curved convexly. A compressible seal ring 9 is provided under the disc 8 of synthetic material, which ring has a rectangular cross-section. The circuit carrier 3 is positioned on the upper side of the disc 8 of synthetic material for assembling purposes. The seal ring 9 is positioned to the lower side of the disc of synthetic material 8 and the circular area 2 of the conductor path foil 1 is swiveled upwards against the seal ring 9, which enables to create an enclosed free space 16 delineated by the seal ring 9 between the convex lower side 8a of the disc 8 of synthetic material and the circular area 2. A piezo disc 17 and below it a metal disc 18, see FIGS. 2 and 3, are situated on the lower side (not visible in FIG. 1) of the circular area 2.

The components of the tire module are cast with a casting compound 13 and are inserted en bloc after solidifying of the compound into a cap 10, which has an opening 11 in its upper side, into which the filter 7 engages. The cap 10 has an outwardly protruding rim 12, with which it can be fixed to the inner side 20 of the tire 21, see FIG. 3.

Figure 2:
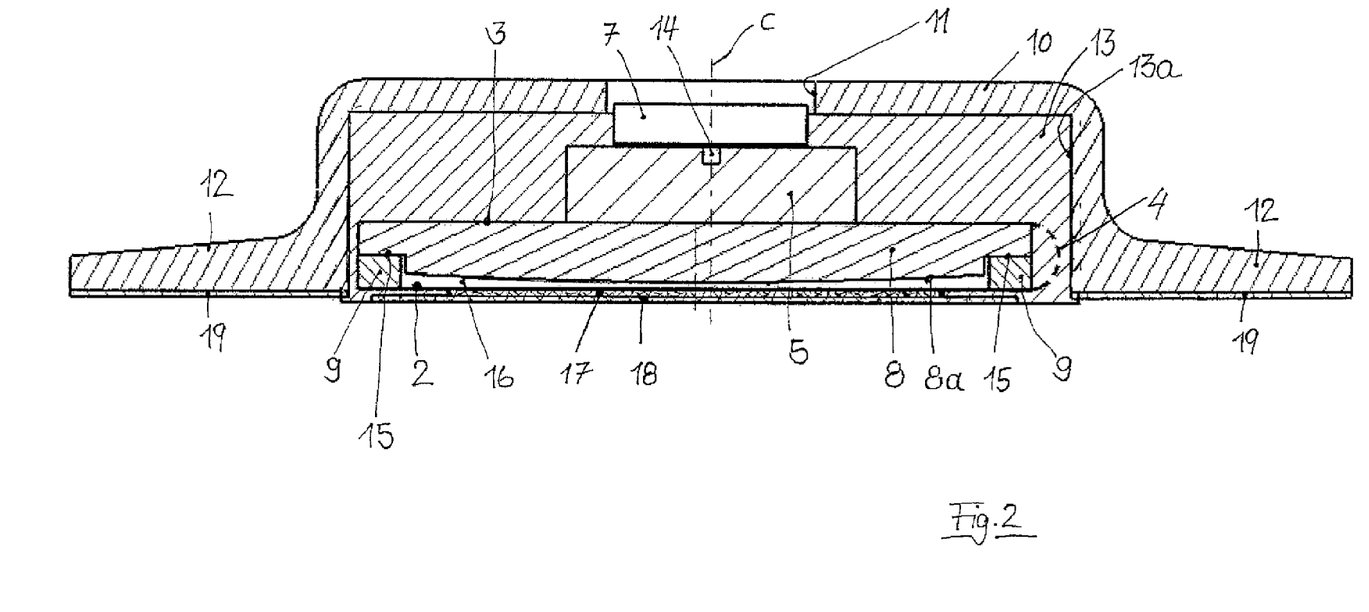
FIG. 2 shows the tire module of FIG. 1, inserted into a cap, in a simplified section through the center line C of the cap.
Figure 3:
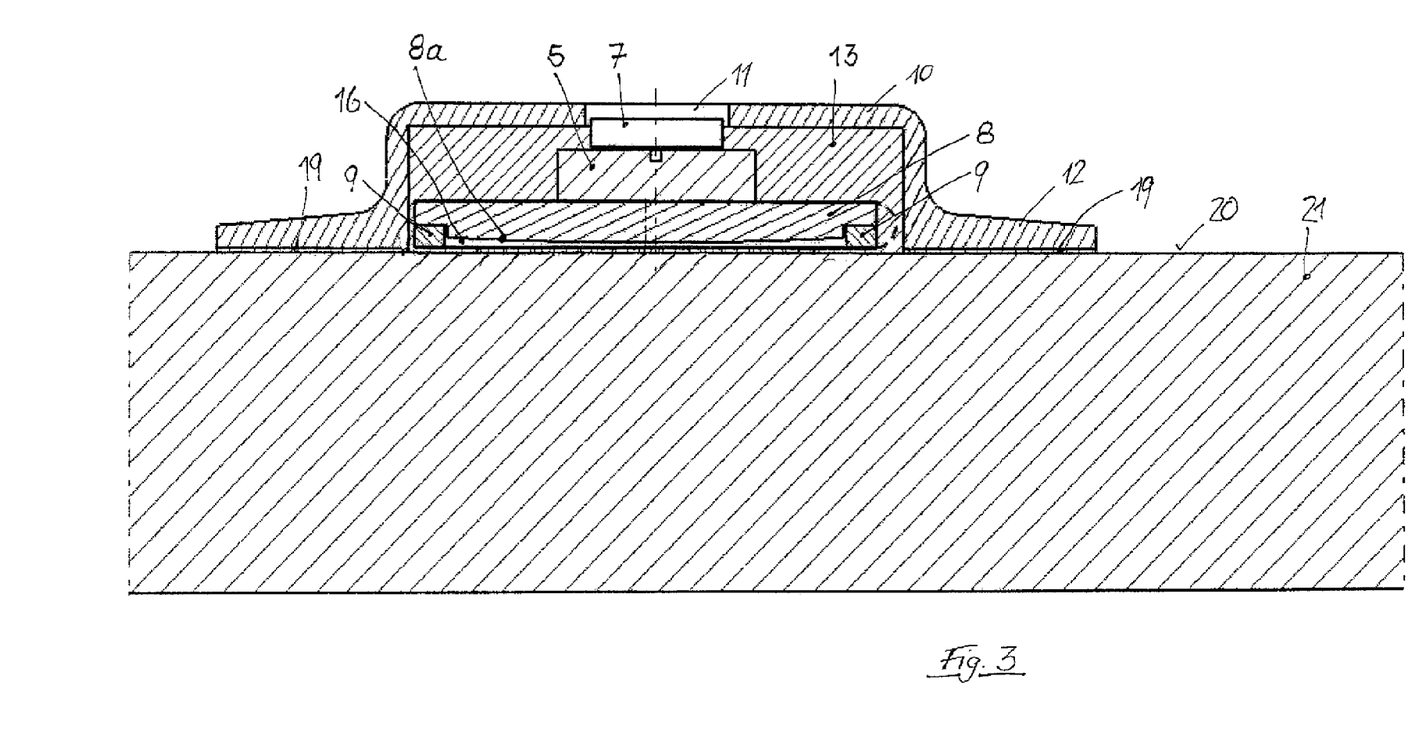
FIG. 3 shows the tire module in a simplified section as in FIG. 2, attached to the inner side of a tire.

FIG. 2 shows how the tire module cast with the casting compound 13 sits in the cap 10. The solidified casting compound 13 has a substantially cylindrical circumferential surface 13a, which has oversize with respect to the clear width of the empty cap 10 so that the cap 10 receives the tire module under mechanical prestress. For allowing the cap 10 to stretch, it consists of an elastomeric material, in particular a rubber-based material.

In FIG. 2, only the IC 5 can be seen among the components on the circuit carrier 3. For simplification purposes, additional components have not been indicated. The position of the opening 14 is specified in the housing of the IC 5 through which opening the pressure sensor provided in the IC 5 can be exposed to the compressed air present in the tire.

It can be seen in the sectional view of the FIG. 2 that the lower side of the disc 8 of synthetic material is provided with a ring shoulder 15 on the rim, on which shoulder the seal ring 9 rests. The seal ring 9 is a radial limitation of the free space 16, which space is situated between the plate 8 of synthetic material and the underlying first circular area 2 of the conductor path foil 1. A piezo disc 17 is arranged on the lower side of the first circular area 2, which preferably consists of a piezo ceramic. A metal disc 18 is fixed under the piezo disc 17. The metal disc 18 advantageously consists of a nickel-iron-alloy with 42 weight % nickel. It can be connected to the piezo disc 17 by means of a conductive adhesive.

The diameter of the metal disc 18 is greater than the diameter of the piezo disc, but not greater than the diameter of both circular areas 2 and 3.

An adhesion promoter 19 is provided on the lower side of the flange 12 of the cap 10, for instance a hot melt. Said promoter enables to glue the cap 10 together with the inserted tire module, as illustrated in FIG. 3, on the inner side 20 of a tire 21 depicted schematically and in part only. An alternative fastening possibility is the vulcanization of the flange 12 on the inner side 20 of the tire 21.

FIG. 3 shows that the height of the tire module has a slight oversize with respect to the clear height of the cap 10. When connecting the flange 12 to the inner side 20 of the tire 21, the tire module is pressed into the stretching cap 10 and is maintained therein free of play on all sides.

Figure 4:
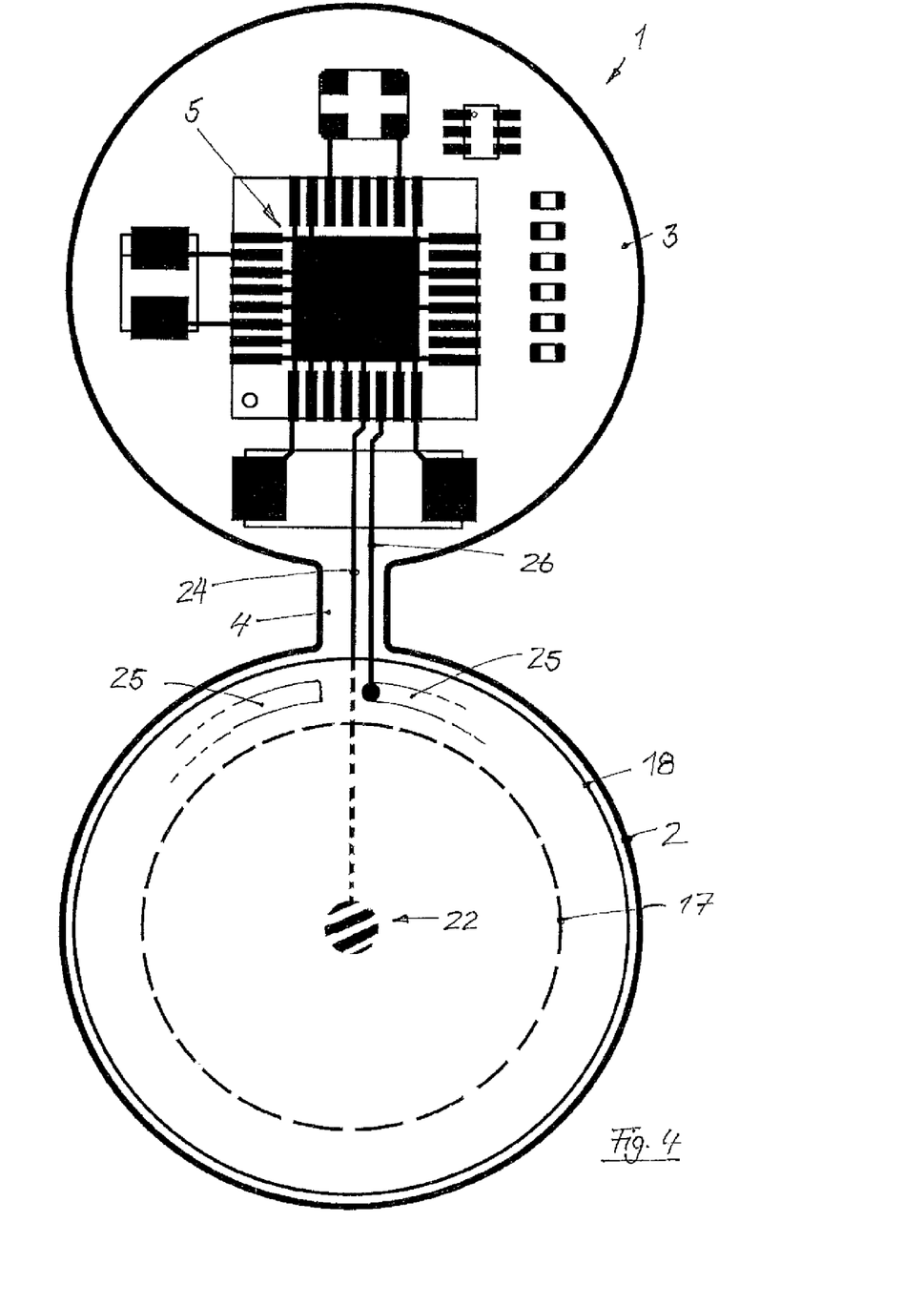
FIG. 4 shows a top view on the unfolded conductor path foil fitted with components.

FIG. 4 shows the unfolded conductor path foil 1, which forms the first circular area 2 and the second circular area 3, which are connected to each other in a single piece by the strip 4. The conductor path foil 1 is flexible and is therefore also designated as a flexfoil. The piezo disc 17 is arranged on the circular area 2. The piezo disc 17 is masked by the circular metal disc 18 and therefore only indicated by broken lines. The piezo disc 17 and the metal disc 18 are arranged coaxially to the circular area 2. The diameter of the metal disc 18 is only a little smaller than the diameter of the circular area 2. The diameter of the piezo disc 17 is smaller than the diameter of the metal disc 18.

The metal disc 18 is connected to the piezo disc 17 for instance by means of an electrically conducting adhesive and creates an electrical contact over its whole surface with the first side of the piezo disc 17. The second side of the piezo disc 17 is electrically contacted by means of the conductor path foil 1. One or several contact points 22 are arranged in the middle region of the piezo disc 17, which points are connected to one another by conductor paths 23 of the conductor path foil and are connected by a conductor path 24 of the conductor path foil to an input of the integrated circuit 5. The metal disc 18 is soldered along a circular arc 25, which runs in the vicinity of the rim of the metal disc 18 and extends over a circumferential angle slightly less than 360°, and is connected by a conductor path 26 of the conductor path foil to a further input of the integrated circuit 5. In this manner, the piezo voltage occurring at the piezo disc 17 is transmitted to the integrated circuit 5 and to a capacitor or similar storage device 30 for electric energy via a rectifier 28 (not shown in FIG. 4), see FIG. 5.

On the metal plate 18 both conductor paths 24 and 26 are insulated from each other by an electrically insulating varnish.

The components illustrated on the circular area 3 of the conductor path foil are only represented schematically and without their functional connections, only to show that the circular area 3 is a circuit carrier.

Figure 5:
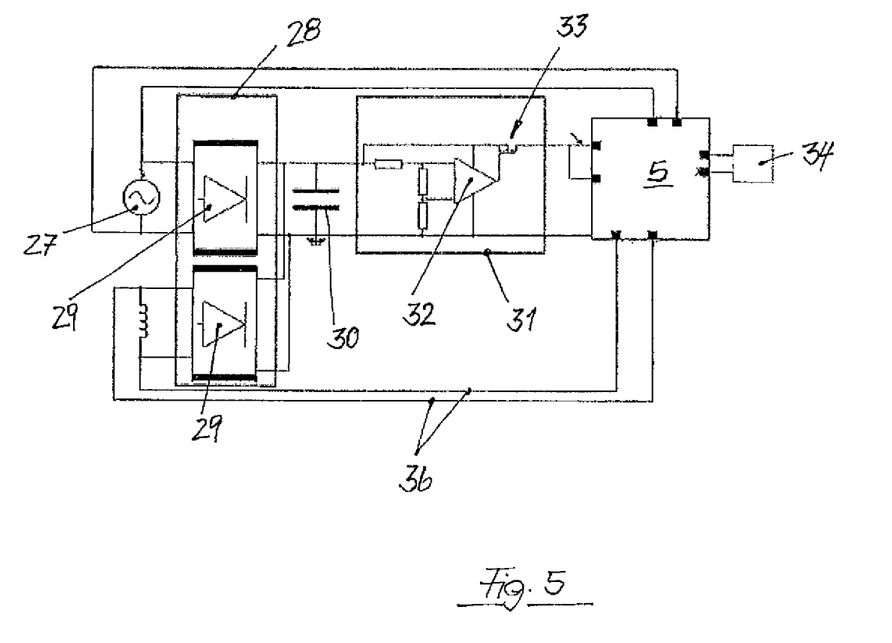
FIG. 5 shows a simplified block diagram of the electrical circuit accommodated in the tire module.

FIG. 5 is a simplified circuit diagram of the tire module. It shows the piezo-electrically operating mechanical-electrical converter 27, substantially consisting of the piezo disc 17, the metal disc 18 on one side of the piezo disc 17 and the circular area 2 of the conductor path foil 1 on the other side of the piezo disc 17. The converter 27 is connected on the one hand directly to two inputs of the integrated circuit 5 and on the other hand to a rectifier 28, which comprises several diodes, for instance eight diodes, from which two diodes 29 are represented. The rectifier 28 feeds a storage device 30 for electric energy, which in the present case is a capacitor. The storage device 30 is connected to the integrated circuit 5 via a Power Manager Unit (PMU) 31, which controls the energy supply. The Power Management Unit 31 comprises a comparator 32, which compares the charge level of the storage device 30 to a limit value and (should the limit be exceeded) supplies the integrated circuit 5 with current via a field effect transistor 33. The integrated circuit 5 includes among others a pressure sensor and controls a transmitter 34, which sends out high frequency signals, which have an information content made available by the integrated circuit 5, for instance an indication on the tire pressure, an identifier, indications on the tire, its mileage etc. These signals can for instance be transmitted with a frequency of 433 MHz.

The circuit further comprises a receiving antenna, in particular a magnetic antenna, represented as a winding 35, which is sensitive for relative low-frequency signals, for instance for signals of 125 kHz. These signals can on the one hand be used to transmit control signals and data to the integrated circuit 5, for which purpose the winding 35 is connected to two inputs of the integrated circuit 5 via electric lines 36 and 37. But the low-frequency signals received by the winding 35 can also be used to charge up the storage device 30. In such a case, the signals are conveyed to the rectifier 28.

The storage device 30 is designed in such a way that its charge is sufficient for several measurement and transmission processes, once it has been fully charged up. The measurement and transmission processes can for instance be respectively triggered when the charge level of the storage device 30 exceeds a preset limit value. Since the mechanical-electrical converter 27 makes available a certain charge quantity for the storage device 30 at every wheel revolution, measurements can thus be done and sent more frequently when speed increases. But the frequency of the measurement and transmission processes can be limited by the integrated circuit 5, when the charge level is high, for not to measure and send more often than necessary.

When driving slowly or at standstill, when the value is below the limit value of the charge level, the Power Manager Unit 31 can turn off the integrated circuit 5. If the charge level of the storage device 30 again exceeds the preset limit value of the charge level of the storage device 30, the integrated circuit 5 can again be activated and resume its measurement and transmission processes.

The mechanical-electrical converter 27 delivers two striking electrical pulses of different polarity at every passage of the tire through the tread shuffle. This enables the integrated circuit 5 to differentiate between standstill and driving and to recognize the speed of the vehicle. The amount of electric energy conveyed to the storage device 30 at higher speeds is sufficient to measure and send the tire pressure not only regularly, for instance every 10 seconds, but also to transmit characteristic data of the tire, in particular a tire identifier, a type of tire and its mileage.

The time interval between both striking pulses, which are generated when passing through the tread shuffle, enables to determine the length of the tread shuffle. This is an important safety aspect, because the length of the tread shuffle does not only depend on the filling level of the tire but also on the load of the vehicle. The length of the tread shuffle increases with the load. An inadmissibly high load can be detected by interpreting the measured length of the tread shuffle and signalized to the driver. The determination of the length of the tread shuffle also matters because it co-determines the wear to which the tire is exposed.

LIST OF REFERENCE NUMBERS

| | |
|---|---|
| 1. | Conductor path foil |
| 2. | First circular area |
| 3. | Second circular area, circuit carrier |
| 4. | Strip |
| 5. | Integrated circuit with pressure sensor |
| 6. | Component |
| 7. | Filter |
| 8. | Distance washer of synthetic material |
| 8a. | Lower side of 8, convex side |
| 9. | Seal ring |
| 10. | Cap |
| 11. | Opening in 10, Access |
| 12. | Flange |
| 13. | Casting compound |
| 13a. | Circumferential surface of 13 |
| 14. | Opening in 5, Access |
| 15. | Ring shoulder |
| 16. | Free space |
| 17. | Piezo disc |
| 18. | Metal disc |
| 19. | Adhesion promoter |
| 20. | Inner side of the tire |
| 21. | Tire |
| 22. | Contact point |
| 23. | Conductor path |
| 24. | Conductor path |
| 25. | Arc of a circle |
| 26. | Conductor path |
| 27. | Converter |
| 28. | Rectifier |
| 29. | Diodes |
| 30. | Storage device |
| 31. | Power manager unit |
| 32. | Comparator |
| 33. | Field effect transistor |
| 34. | Transmitter |
| 35. | Winding, receiving antenna |
| 36. | Electric line |
| 37. | Electric line |
| C. | Center line |

What is claimed is:

1. A tire module for installation on an inner side of a pneumatic tire for vehicles, comprising:
   a device for measuring and/or monitoring of the air pressure in the tire;
   a transmitter for transmitting radio signals containing information about the air pressure in the tire;
   a mechanical-electrical converter having a bendable piezoelectric element, for converting, into electrical energy, alternating deformations of the piezoelectric element caused by the rolling tire; and a storage device for the electric energy, said storage device being connected to the converter, the converter comprising a circular, disc-shaped, piezoelectric element (piezo disc) and an electrical voltage generated by the piezo effect is tapped at contact points, situated on opposite sides of the piezo disc, wherein the piezo disc is arranged between a metal disc on the first side and a flexible conductor path foil on the second side of the piezo disc and wherein the conductor path foil, covering the first side of the piezo disc, forms a circular area connected to a circuit carrier by a strip, said strip comprising the conductor path foil and beginning from a rim of the circular area.

2. A tire module according to claim 1, wherein a contact point is formed by the circular metal disc, which fully covers a first side of the piezo disc.

3. A tire module according to claim 2, wherein the metal disc has a larger diameter than the piezo disc.

4. A tire module according to claim 1, wherein a second side of the piezo disc is only provided partially with several contact points, connected to each other in an electrically conductive manner.

5. A tire module according to claim 4, wherein the several contact points are arranged centrally on the second side of the piezo disc.

6. A tire module according to claim 4, wherein the several contact points on the second side of the piezo disc cover at most between 10% and 20%, of the surface of the second side of the piezo disc.

7. A tire module according to claim 1, wherein the metal disc sticks to the piezo disc.

8. A tire module according to claim 1, wherein the circuit carrier also consists of the conductor path foil.

9. A tire module according to claim 8, wherein the circuit carrier also forms a circular area and that both circular areas are connected to each other integrally by the strip.

10. A-tire module according to claim 9, wherein both circular areas match in diameter.

11. A tire module according to claim 9, wherein both circular areas are coaxially arranged on top of one another with a circular distance washer disposed there-between.

12. A tire module according to claim 11, wherein the distance washer is curved convexly on a side pointing to the piezo disc.

13. A tire module according to claim 11, wherein a seal ring is provided between the distance washer and the circular area formed by the conductor path foil, faces the piezo disc.

14. A tire module according to claim 12, wherein the components of the tire module, with the exception of a free space between the convex side of the distance washer and the circular area pointing to the convex side of the distance washer, as well as with the exception of the side of the metal disc facing away from the piezo disc, are embedded in an electrically insulating casting compound.

15. A tire module according to claim 14, wherein the solidified casting compound has a substantially cylindrical circumferential surface.

16. A tire module according to claim 15, further comprising a cap for receiving the cast tire module, said cap having a flange connecting said cap to an inner side of the tire.

17. A tire module according to claim 16, wherein a circumferential surface of the solidified casting compound has oversize with respect to the clear width of the empty cap.

18. A tire module according to claim 16, wherein the cap and the solidified casting compound provide an access to a pressure sensor provided in the tire module.

19. A tire module according to claim 1, further comprising a receiving antenna for the reception of transport information signals and electrical energy for charging the storage device.

20. A tire having an inner side fastened to a tire module according to claim 1.

21. A tire module for installation on an inner side of a pneumatic tire for vehicles, comprising:
    a device configured for measuring and/or monitoring the air pressure in the pneumatic tire;
    a transmitter configured to transmit radio signals containing information about the air pressure in the tire;
    a mechanical-electrical converter, having a circular and bendable piezoelectric element, configured to convert into electrical energy alternating deformations of the piezoelectric element caused by the rolling tire, wherein the electrical energy generated by the piezo effect is tapped at contact points situated on opposite sides of the piezoelectric element; and
    a capacitor or an accumulator connected to the mechanical-electrical converter and configured to store the electrical energy generated by the mechanical-electrical converter, wherein the capacitor or accumulator is configured to provide the electrical energy to and for the operation of the device and the transmitter once it has been charged to a threshold power level.

22. A tire module for installation on an inner side of a pneumatic tire for vehicles, comprising:
    a device configured for measuring and/or monitoring the air pressure in the pneumatic tire;
    a transmitter configured to transmit radio signals containing information about the air pressure in the tire;
    a mechanical-electrical converter, having a bendable piezoelectric element, configured to convert into electrical energy alternating deformations of the piezoelectric element caused by the rolling tire, wherein the bendable piezoelectric element is configured to be adjacent to the inner side of the pneumatic tire;
    a capacitor or an accumulator connected to the mechanical-electrical converter and configured to store the electrical energy generated by the mechanical-electrical converter, wherein the capacitor or accumulator is configured to provide the electrical energy to and for the operation of the device and the transmitter once it has been charged to a threshold power level; and
    a free space adjacent to the piezoelectric element disposed inside the tire module.

* * * * *